(12) United States Patent
Jibbe et al.

(10) Patent No.: US 8,296,782 B2
(45) Date of Patent: Oct. 23, 2012

(54) SYSTEM ELIMINATING HARDWARE DUPLICATION DURING APPLICATION TESTING OF AN INTERNAL STORAGE ARRAY ACROSS DIFFERENT OPERATING SYSTEMS

(75) Inventors: Mahmoud K. Jibbe, Wichita, KS (US);
Preeti Badampudi, Bangalore (IN);
Soham Kar, Bangalore (IN);
Shivprasad Prajapati, Bangalore (IN)

(73) Assignee: LSI Corporation, Milpitas, CA (US)

( * ) Notice: Subject to any disclaimer, the term of this patent is extended or adjusted under 35 U.S.C. 154(b) by 1062 days.

(21) Appl. No.: 12/238,858

(22) Filed: Sep. 26, 2008

(65) Prior Publication Data

US 2009/0265724 A1    Oct. 22, 2009

Related U.S. Application Data

(60) Provisional application No. 61/046,815, filed on Apr. 22, 2008, provisional application No. 61/080,806, filed on Jul. 15, 2008, provisional application No. 61/080,762, filed on Jul. 15, 2008, provisional application No. 61/100,034, filed on Sep. 25, 2008.

(51) Int. Cl.
*G06F 13/00*    (2006.01)

(52) U.S. Cl. .................. 719/328; 719/321; 711/100

(58) Field of Classification Search .................. None
See application file for complete search history.

(56) References Cited

U.S. PATENT DOCUMENTS 6,493,772 B1 * 12/2002 Hughes .................. 710/19

* cited by examiner

*Primary Examiner* — Qing Wu
(74) *Attorney, Agent, or Firm* — Christopher P. Maiorana, PC

(57) ABSTRACT

A method for capturing data comprising the steps of (A) handling a call for a first operating system at a storage library, (B) routing the call from the storage library to a controller firmware, (C) sending a response to the call from the controller firmware to the storage library, and (D) storing the response in a data store box for later use by the storage library.

16 Claims, 4 Drawing Sheets

SYSTEM ELIMINATING HARDWARE DUPLICATION DURING APPLICATION TESTING OF AN INTERNAL STORAGE ARRAY ACROSS DIFFERENT OPERATING SYSTEMS

CROSS REFERENCE TO RELATED APPLICATIONS

The present application may relate to application Ser. No. 61/046,815, filed Apr. 22, 2008, Ser. No. 12/143,123, Filed Jun. 20, 2008, now U.S. Pat. No. 7,958,397, issued Jun. 7, 2011, Ser. No. 61/080,806, Filed Jul. 15, 2008, Ser. No. 61/080,762, Filed Jul. 15, 2008, Ser. No. 12/178,064, Filed Jul. 23, 2008 and Ser. No. 61/100,034, Filed Sep. 25, 2008, which are each hereby incorporated by reference in their entirety.

FIELD OF THE INVENTION

The present invention relates to storage arrays generally and, more particularly, to a method and/or apparatus for eliminating hardware duplication for application testing of an internal storage array across different operating systems.

BACKGROUND OF THE INVENTION

Conventional networks have many user software applications. Software applications (i.e., Megaraid Storage Manager (MSM), Raid Web Console 2 (RWC 2), and Server Raid Storage Manager (SSM)) are tested with the same firmware across different operating systems (OS). A separate setup is used for an application for every operating system a software application is being tested on. Such testing incurs effort to setup the separate hardware. Several setups are needed for each operating system.

The certification of an internal storage device (i.e., an array card inside a server) is going to use a different hardware setup for each operating system. Different setups are used even though the array controller will respond the same for different input stimuli regardless of the operating system.

Conventional systems use a different test setup for each operating system. Such systems have the following disadvantages (i) high cost of equipment to certify an array card (due to the hardware duplication between different operating systems), (ii) hardware issues encountered when trying to certify an array controller firmware, and (iii) hardware variability (which is often verified during board start up), will impact array controller firmware certification schedules.

It would be desirable to implement a system to eliminate hardware duplication during application testing of an internal storage array across different operating systems.

SUMMARY OF THE INVENTION

The present invention concerns a method for capturing data comprising the steps of (A) handling a call for a first operating system at a storage library, (B) routing the call from the storage library to a controller firmware, (C) sending a response to the call from the controller firmware to the storage library, and (D) storing the response in a data store box for later use by the storage library.

The objects, features and advantages of the present invention include providing a testing system that may (i) emulate the functionality of an array controller firmware of an array card inside the server, (ii) record the responses of an array controller firmware of an array card (e.g., creating a data store box), (iii) respond to application stimuli without actually having the hardware (e.g., playing back the data store box) and/or (iv) minimize the need to verify the responses of an array controller for each operating system.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
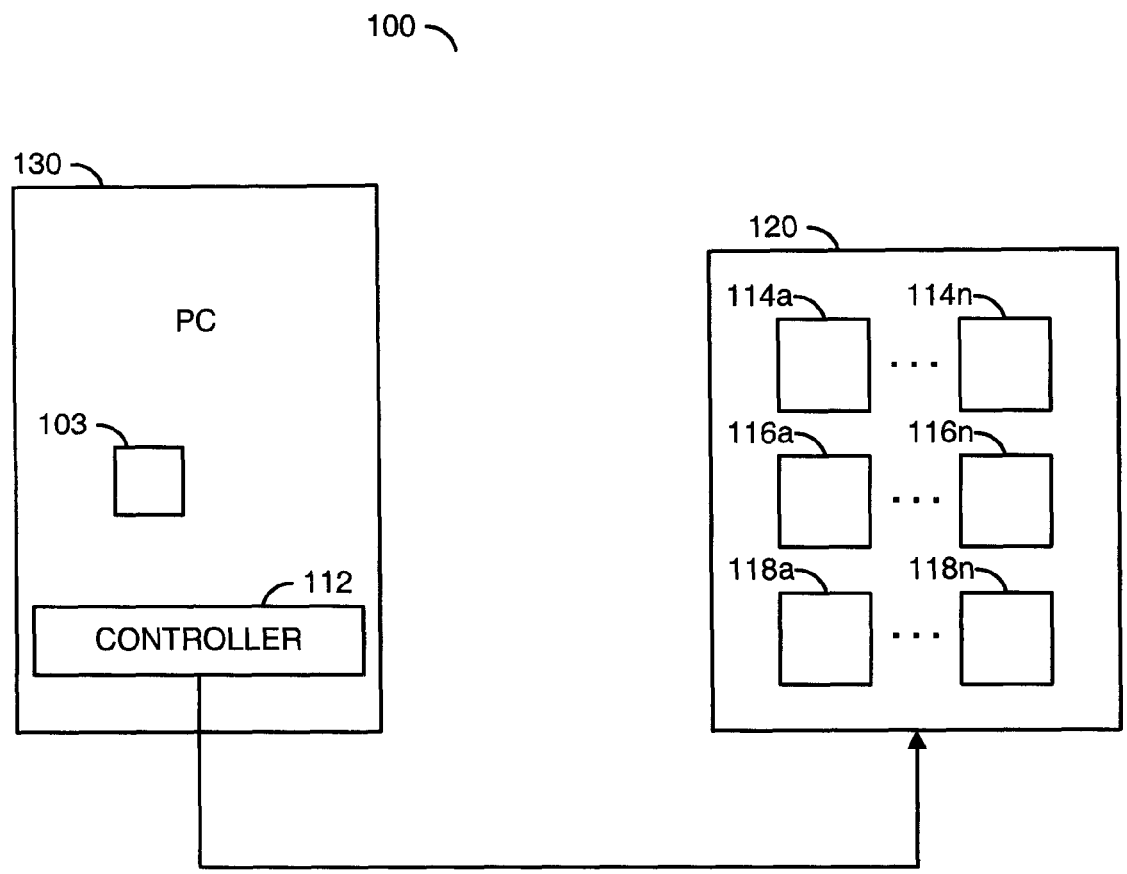
FIG. 1 is a block diagram of an embodiment of the present invention.

Referring to FIG. 1, a block diagram of a system 100 is shown illustrating a context of the present invention. The system 100 generally comprises a block (or circuit) 120 and a block (or circuit) 130. The circuit 120 may be implemented as a number of storage devices (e.g., a storage drive) or arrays. The circuit 130 may be implemented as a Personal Computer (PC). The circuit 130 generally comprises a block (or circuit) 103 and a block (or circuit) 112. The circuit 112 may be implemented as a controller. In one example, the circuit 112 may be implemented as a serial attached SCSI (SAS) controller. The circuit 103 may be implemented as a computer readable medium 103 configured to store instructions for executing a program. In one example, the computer readable medium 103 may be implemented as an on board hard disk drive (e.g., IDE, SCSI, or SATA) with an operating system and software applications (e.g., MSM, RWC, and SSM) pre-installed.

The storage array 120 may have a number of storage devices (e.g., drives or volumes) 114a-114n, a number of storage devices (e.g., drives or volumes) 116a-116n and a number of storage devices (e.g., drives or volumes) 118a-118n. In one example, each of the storage devices 114a-114n, 116a-116n, and 118a-118n may be implemented as one or more physical drives, one or more logical drives, and/or one or more drive enclosures. In one embodiment, the storage array 120 may be implemented in a rack. The rack may also house the PC 130. In one example, the storage array 120 may be directly connected to the PC 130 (e.g., a direct attached storage configuration). In another example, the storage array 120 may be implemented externally and attached to the PC 130. For example, the storage array 120 may be an external enclosure that may be connected to the PC 130. In another embodiment, the PC 130 may be implemented as an internal backplane with the storage array 120 being attached (e.g., Intel, FSC PC with internal backplane, etc.).

The controller 112 may have internal and/or external ports. In one example, the controller 112 and the storage array 120 may be connected directly using cables (e.g., internal/external connector of the controller 112 to an external port of the storage array 120). The storage array 120 may also be implemented as a separate device from the controller 112. In another embodiment, the storage array 120 may be implemented as part of the controller 112 (not shown). In one example, the storage array 120 may be implemented as part of a file server. In such an example, the storage array 120 may be connected to the PC 130. The PC 130 may be connected to a network (e.g., a local network, the Internet, etc.). The storage array 120 may be accessed from the PC 130 by another computer and/or file server connected to the network.

Figure 2:
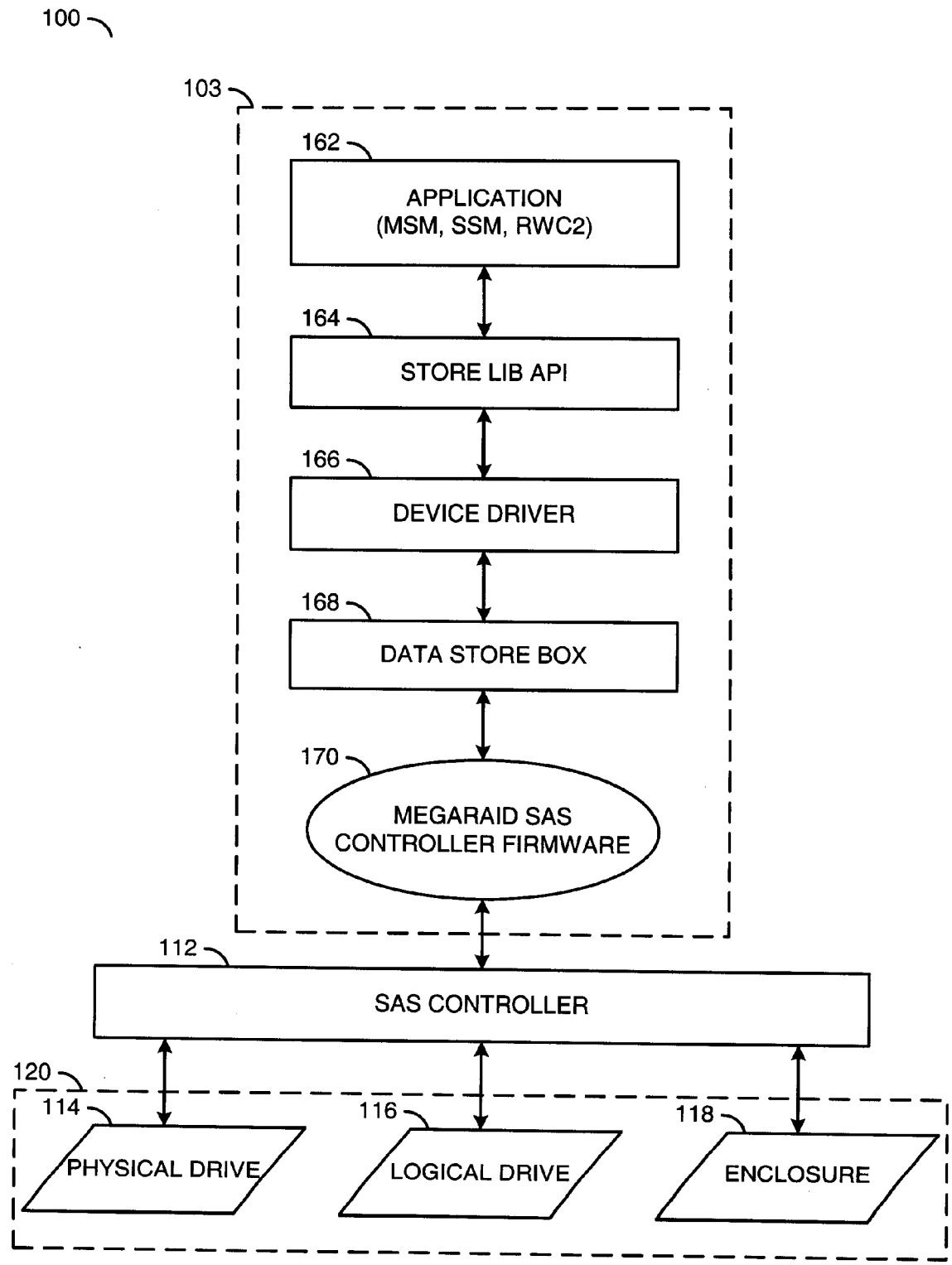
FIG. 2 is a more detailed block diagram of an embodiment of the present invention.

Referring to FIG. 2, a more detailed block diagram of the system 100 with more details of the block 103 is shown in accordance with an embodiment of the present invention. The block 103 generally comprises a block (or circuit) 162, a block (or circuit) 164, a block (or circuit) 166, a block (or circuit) 168, and a block (or circuit) 170. The block 120 generally comprises the block 114 (e.g., one or more of the blocks 114a-114n), the block 116 (e.g., one or more of the blocks 116a-116n) and the block 118 (e.g., one or more of the blocks 118a-118n). The circuit 162 may be implemented as a software application. The circuit 164 may be implemented as a storage library circuit. The circuit 166 may be implemented as a device driver. The circuit 168 may be implemented as a data store box. The circuit 170 may be implemented as a firmware block. In one example, the firmware 170 may be implemented as Megaraid SAS controller firmware. The circuit 112 may be implemented as an SAS controller.

The system 100 may be used to minimize the hardware used for testing user application software. The hardware needed may include the controller 112, one or more of the disk drives 114a-114n, 116a-116n and/or 118a-118n and a server (e.g., the PC 130). The software applications 162 may send a request to the Megaraid SAS controller firmware 170. The Megaraid SAS controller firmware 170 may send a response to the software applications 162 in response to the request. The response may be captured by the data store box 168 when an operation may be done on the SAS controller 112. The captured information may be used as a dummy controller (i.e., the data store box 168). The data store box 168 may communicate with the software applications 162 as the SAS controller 112. The system 100 may send and/or receive calls from the Megaraid SAS controller firmware 170. The calls may be trapped and stored to reproduce conditions similar to a real hardware configuration.

The storage library (StoreLib) 164 may use a method called Application Programmable Interface (API). The StoreLib API 164 may be a library of storage device-related commands that enable the software applications 162 to interface with the Serial Attached SCSI (SAS) storage controller 112. The StoreLib API 164 commands may also enable a user to perform configuration tasks such as creating or deleting a logical drive 116, adding a dedicated hotspare, rebuilding a drive, or preparing a physical drive 114 for removal. The StoreLib API 164 may be loaded by the software application 162 at startup and become part of the application. Structurally, the StoreLib API 164 may be located between the software applications 162 and the device driver 166, as shown in FIG. 2. However, the StoreLib API 164 may be implemented in other locations to meet the design criteria of a particular implementation.

The software applications 162 (e.g., MSM, SSM, RWC2, etc.) may be operating system (OS) level raid utilities. The software applications 162 may also be available for different operating systems. One or more of the software applications 162 may call a middle tier application (e.g., Storelib API 164). The Storelib API 164 may handle and route the calls to the Megaraid SAS controller firmware 170. The StoreLib API 164 may also enable the software application 162 to receive and display information about the SAS controller 112 and the devices connected to the controller 112. For example, the software application 162 may display the status of a battery backup unit, the properties of the controller 112, or the number and/or status of all of the physical drives 114a-114n, 116a-116n, and/or 118a-118n connected to the controller 112. The StoreLib API 164 may also collect information from activities performed on the SAS controller 112 and transmit the information to the software application 162. In one example, the device driver 166 may act as a pass through. The Megaraid SAS controller firmware 170 may handle the operations performed on the SAS controller 112. The Megaraid SAS controller firmware 170 may also handle the attached storage (i.e., the storage array 120) and send the information to the StoreLib API 164.

In one example, the information may be captured at a layer where exchange of the information may happen between the StoreLib API 164 and the Megaraid SAS controller firmware 170. The data store box 168 may hold this information (e.g., calls sent to and responses returned by the controller firmware 170, alert messages sent by the controller 112, etc.). The StoreLib API 164 may provide Asynchronous Event Notification (AEN), a highly efficient mechanism for notifying selected processes when a particular event occurs on the controller 112 or on the devices 120 attached to the controller 112. The StoreLib API 164 may use Asynchronous Event Notifications (AENS) to access information from the SAS controller 112 or send acquired data to the software applications 162. The StoreLib API 164 may execute a set of commands that the Megaraid SAS controller firmware 170 responds to with the corresponding Megaraid Firmware API commands (to be discussed in more detail in connection with FIG. 3).

Figure 3:
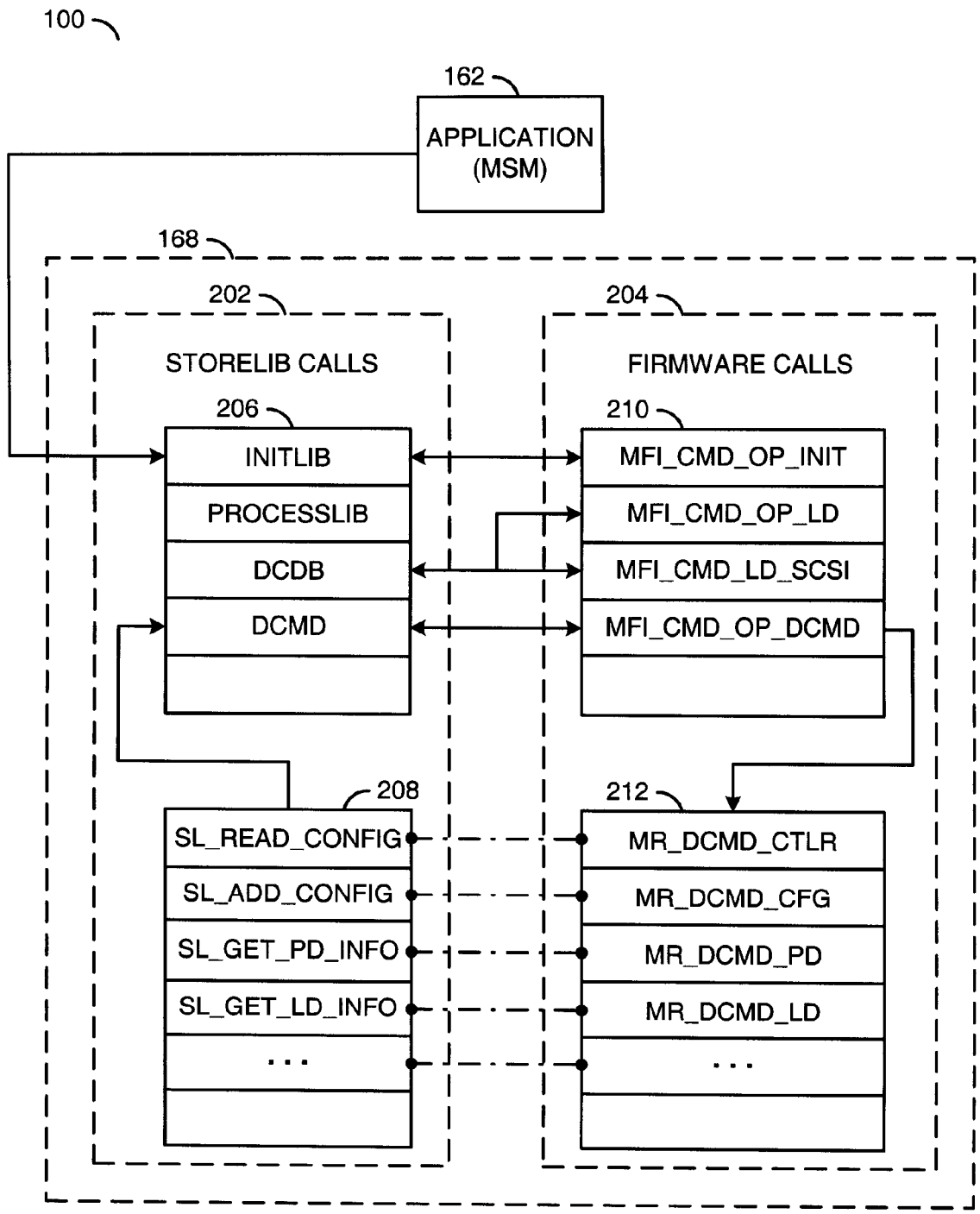
FIG. 3 is a detailed block diagram illustrating the processing of captured data.

Referring to FIG. 3, a detailed block diagram of the data store box 168 is shown in accordance with an embodiment of the present invention. The data store box 168 generally comprises a block (or circuit) 202 and a block (or circuit) 204. The circuit 202 may be implemented as a set of StoreLib calls. The circuit 204 may be implemented as a set of Firmware calls. The circuit 202 generally comprises a block (or circuit) 206 and a block (or circuit) 208. The circuit 206 may be implemented as a set of Storelib API data (e.g., INITLIB, PROCESSLIB, DCDB, and DCMD). The circuit 208 may be implemented as a set of asynchronous event notification (AEN) data (e.g., SL_READ_CONFIG, SL_ADD_CONFIG, SL_GET_PD_INFO, SL_GET_LD_INFO). The circuit 204 generally comprises a block (or circuit) 210 and a block (or circuit) 212. The circuit 210 may be implemented as a set of Megaraid firmware API data (e.g., MFI_CMD_OP_INIT, MFI_CMD_OP_LD, MFI_CMD_LD_SCSI, and MFI_CMD_OP_DCMD). The circuit 212 may be implemented as a set of AEN data (e.g., MR_DCMD_CTLR, MR_DCMD_CFG, MR_DCMD_PD, MR_DCMD_LD).

For example, a user may try to get the information related to a specific physical drive 114. The Storelib API 164 may be sought and a corresponding API of the Storelib API 164 may be called. A command (e.g., DCMD) may be issued and a corresponding AEN (e.g., SL_GET_PD_INFO) may be called for. The Megaraid SAS controller firmware 170 may then call the Megaraid firmware API (e.g., MFI_CMD_OP_DCMD). The Megaraid firmware API may point to an AEN (e.g., MR_DCMD_PD). The AEN MR_DCMD_PD may provide information related to the specific physical drive 114. In another example, every Storelib AEN may call for or point to a specific firmware AEN (e.g, SL_GET_PD_INFO pointing to MR_DCMD_PD).

The captured information may be stored in a structured manner and may be replicated whenever there is a necessity of a similar real time setup for the software applications 162 testing. FIG. 3 is a replica of how the captured data may be processed in order to act as a replacement of the SAS controller 112. Every time one of the software applications 162 tries to access the SAS controller 112, the same responses are given by the Megaraid SAS controller firmware 170. Therefore, the flow of the captured data may be as shown in FIG. 3.

In one example, the data store box 168 may be used to replace an actual physical controller and/or controller firmware running on the physical controller and/or storage device attached to the controller 112. The data store box 162 may eliminate the total amount of hardware needed. The responses of the Megaraid SAS controller firmware 170 may only need to be verified when the data store box 168 is created. The data store box 168 may also be used for testing various types of applications (e.g., MSM, SSM, RWC, etc.) across different operating systems at the same time. Testing the software applications 162 at the same time may remove the hardware variability factor when certifying the Megaraid SAS controller firmware 170.

Figure 4:
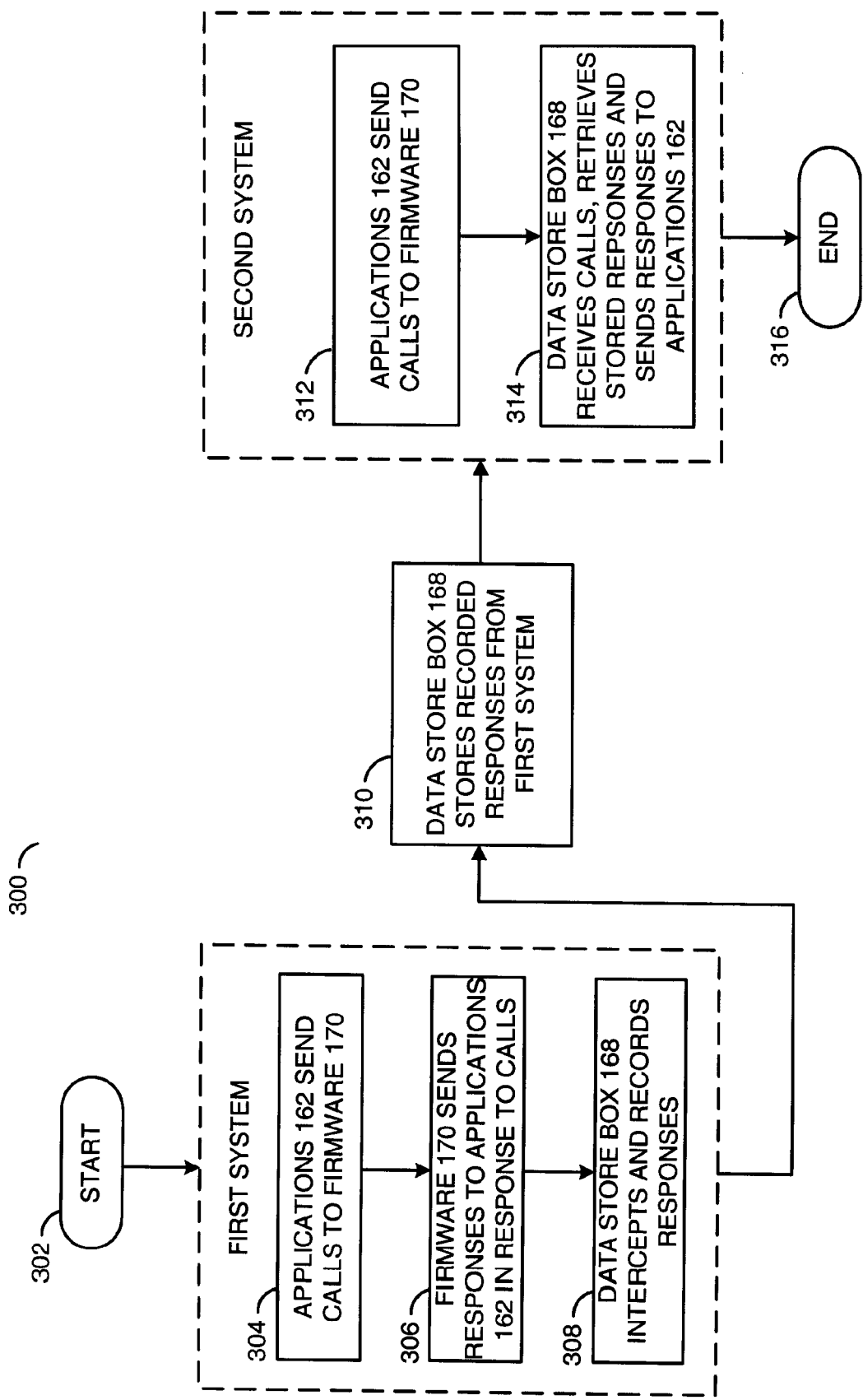
FIG. 4 is a flow chart in accordance with an embodiment of the present invention.

Referring to FIG. 4, a flow diagram of a process 300 is shown. The process (or method) 300 generally comprises a step (or state) 302, a step (or state) 304, a step (or state) 306, a step (or state) 308, a step (or state) 310, a step (or state) 312, a step (or state) 314, and a step (or state) 316. The process 300 may start in the step 302. In the step 304, the applications 162 may send a first set of calls to the controller firmware 170 for a first system (or server) having a first operating system (e.g., Windows, Linux, etc.). In the step 306, the controller firmware 170 may send a set of responses to the applications 162 in response to the first set of calls. In the step 308, the data store box 168 may intercept and record the set of responses from the controller firmware 170. In the step 310, the data store box 168 may store the set of recorded responses. In the step 312, the applications 162 may send a second set of calls to the controller firmware 170 for a second system (or server) having a second operating system (e.g., Windows, Linux, etc.) different from the first operating system. In the step 314, the data store box 168 may receive the second set of calls from the second system. The step 314 may directly retrieve the previously stored set of responses from the data store box 168. The step 314 may send the set of responses (e.g., previously used for testing the first system) to the applications 162. In the step 316, the process 300 may end. In one embodiment, the process 300 may be repeated for several different operating systems. In contrast to testing the first system where the data store box 168 intercepts the responses from the controller firmware 170, when testing the second system the data store box 168 may directly retrieve the previously stored responses. By using the previously stored set of responses, the method 300 may reduce hardware duplication when testing the second system.

While the invention has been particularly shown and described with reference to the preferred embodiments thereof, it will be understood by those skilled in the art that various changes in form and details may be made without departing from the scope of the invention.

The invention claimed is:

1. A method for capturing data comprising the steps of:
   (A) handling a call for a first operating system at a storage library;
   (B) routing said call from said storage library to a controller firmware;
   (C) sending a response to said call from said controller firmware to said storage library; and
   (D) storing said response in a data store box for later use by said storage library, wherein said data store box comprises a set of Storelib calls configured to replace said controller firmware running on a controller during one or more configuration tasks performed by a user on a storage array.

2. The method according to claim 1, further comprising the step of:
   sending said response stored in said data store box in response to a second call from a different operating system.

3. The method according to claim 2, wherein said data store box replaces one or more physical controllers.

4. The method according to claim 1, wherein said controller firmware is a Megaraid SAS controller firmware.

5. The method according to claim 1, wherein said storage library comprises an application programmable interface.

6. The method according to claim 1, wherein said set of Storelib calls includes a set of Storelib API data and a set of asynchronous event notification data.

7. The method according to claim 1, wherein said data store box further comprises a set of Firmware calls.

8. The method according to claim 7, wherein said set of Firmware calls includes a set of Megaraid Firmware API data and a set of asynchronous event notification data.

9. An apparatus comprising:
   a controller;
   a storage array connected to said controller; and
   a circuit configured to (i) interface with said controller, (ii) perform a set of tasks, (iii) display information about said controller and said array, and (iv) collect information from activities performed on said controller, wherein a data store box comprises a set of Storelib calls configured to replace firmware running on said controller during one or more configuration tasks performed by a user on said storage array.

10. The apparatus according to claim 9, wherein said circuit comprises one or more applications, said data store box, and a controller firmware.

11. The apparatus according to claim 10, wherein said one or more applications send one or more calls to said controller firmware.

12. The apparatus according to claim 11, wherein said controller firmware sends one or more responses to said one or more applications in response to said one or more calls.

13. The apparatus according to claim 12, wherein said data store box is configured to intercept and store said one or more responses from said controller firmware.

14. The apparatus according to claim 9, wherein said storage array comprises an SAS controller.

15. The apparatus according to claim 10, wherein said firmware controller comprises a Megaraid SAS controller firmware.

16. A method comprising the steps of:
   (A) sending a first set of calls to a controller firmware relating to a first operating system;
   (B) sending a set of responses from said controller firmware in response to said first set of calls;
   (C) intercepting said set of responses with a data store box;
   (D) storing said set of responses with said data store box;
   (E) sending a second set of calls to said controller firmware relating to a second operating system;
   (F) receiving said second set of calls with said data store box;
   (G) retrieving said set of responses with said data store box; and
   (H) sending said stored set of responses from said data store box in response to said second set of calls, wherein said data store box comprises a set of Storelib calls configured to replace said first and second controller firmware during one or more configuration tasks performed by a user on a storage array.

* * * * *